(12) United States Patent
Rácz et al.

(10) Patent No.: US 9,100,855 B2
(45) Date of Patent: Aug. 4, 2015

(54) TECHNIQUE FOR HANDLING CONGESTION CONTROL

(71) Applicant: Telefonaktiebolaget L M Ericsson (publ), Stockholm (SE)

(72) Inventors: Sándor Rácz, Cegléd (HU); Szilveszter Nádas, Budapest (HU)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 153 days.

(21) Appl. No.: 13/937,506

(22) Filed: Jul. 9, 2013

(65) Prior Publication Data

US 2014/0160928 A1 Jun. 12, 2014

(30) Foreign Application Priority Data

Jul. 10, 2012 (EP) .................................. 12005089

(51) Int. Cl.
*H04W 28/02* (2009.01)
*H04W 36/18* (2009.01)

(52) U.S. Cl.
CPC .......... *H04W 28/0273* (2013.01); *H04W 28/02* (2013.01); *H04W 36/18* (2013.01)

(58) Field of Classification Search
USPC .................. 370/235, 232, 329, 331, 230, 412
See application file for complete search history.

(56) References Cited

U.S. PATENT DOCUMENTS

2005/0262266 A1* 11/2005 Wiberg et al. ................ 709/238
2011/0044168 A1* 2/2011 Nádas et al. .................. 370/232
2012/0039169 A1* 2/2012 Susitaival et al. ............ 370/230

FOREIGN PATENT DOCUMENTS

EP 1901493 A1 3/2008
WO 2011025435 A1 3/2011
WO 2011120581 A1 10/2011

OTHER PUBLICATIONS

3rd Generation Partnership Project. "SDU Discard." 3GPP TSG-RAN WG2 #60, Tdoc R2-074689, Nov. 5-9, 2007, pp. 1-6, Jeju, Korea.
3rd Generation Partnership Project. "E-DCH TNL Congestion Control with Soft Handover." TSG-RAN Working Group 3 meeting #51, Tdoc R3-060266, Feb. 13-17, 2006, pp. 1-6, Denver, USA.

* cited by examiner

*Primary Examiner* — Thai Nguyen
(74) *Attorney, Agent, or Firm* — Murphy, Bilak & Homiller, PLLC

(57) ABSTRACT

A method for congestion control in a transport network of a radio access network is disclosed. The method comprises receiving, by the control node, a first uplink flow through a first communication link in the transport network from a first radio access node and receiving, by the control node, a second uplink flow through a second communication link in the transport network from a second radio access node. If congestion is detected in the transport network for either uplink flow, the control node selectively triggers either Active Queue Management (AQM)-based congestion control at the control node, or local congestion control at the for the uplink flow. Triggering is carried out such that AQM-based congestion control is carried out for only one of the first uplink flow or the second uplink flow if congestion is detected for both the first uplink flow and the second uplink flow.

17 Claims, 4 Drawing Sheets

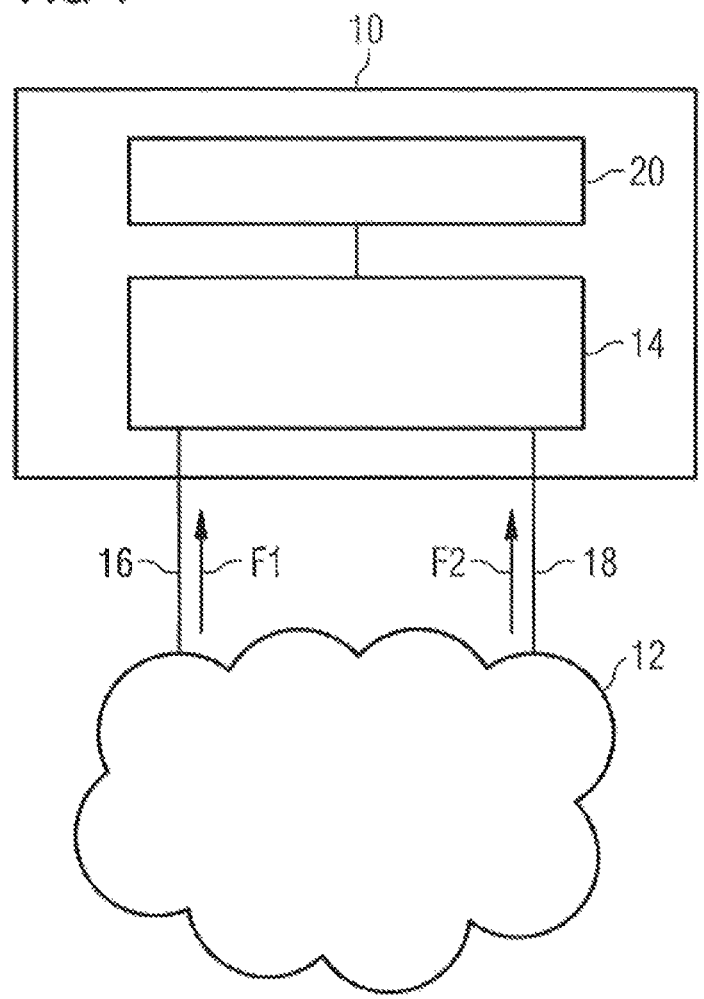

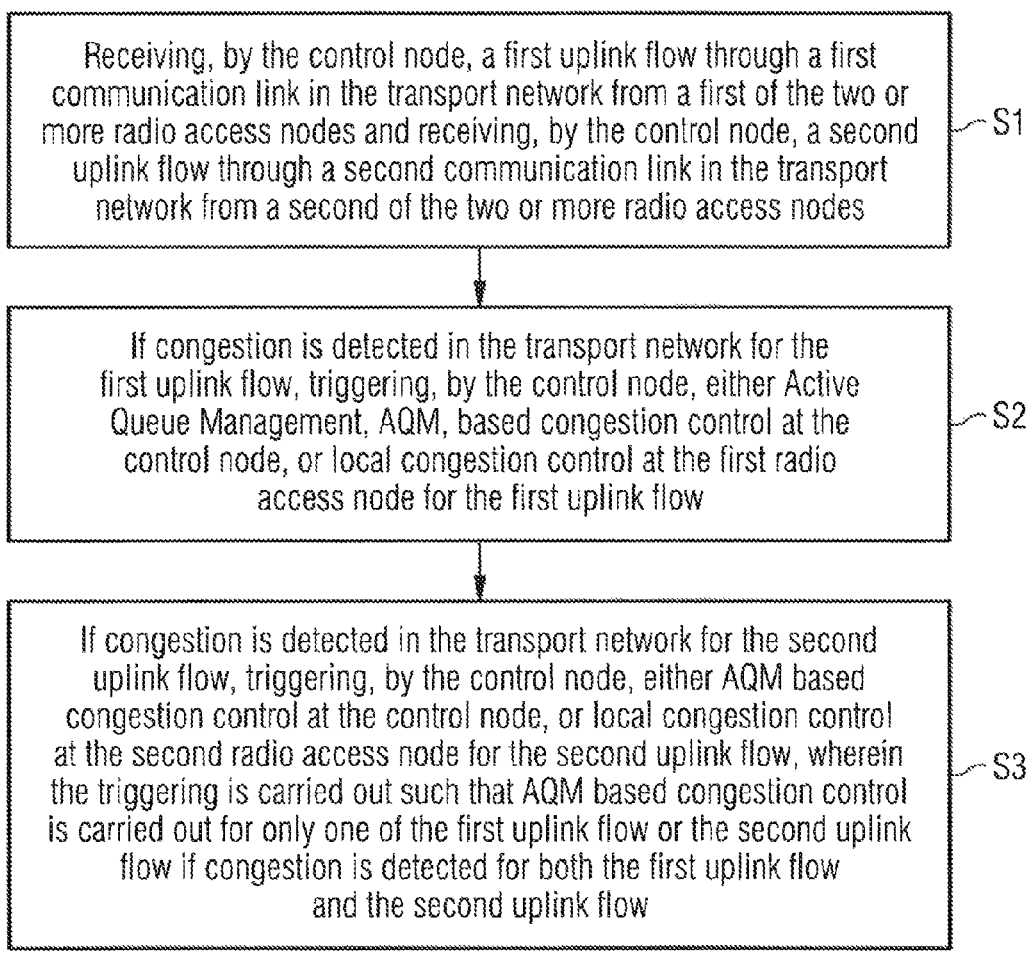

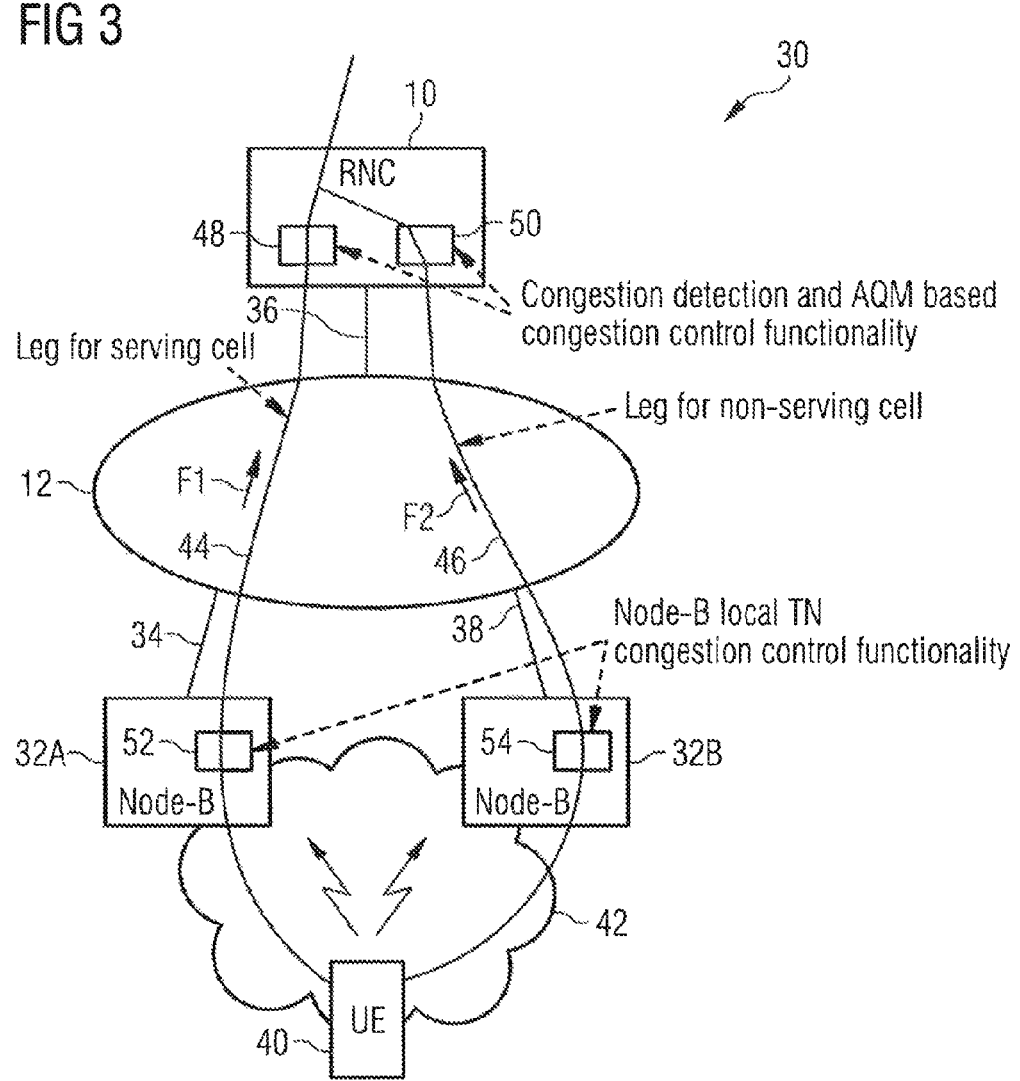

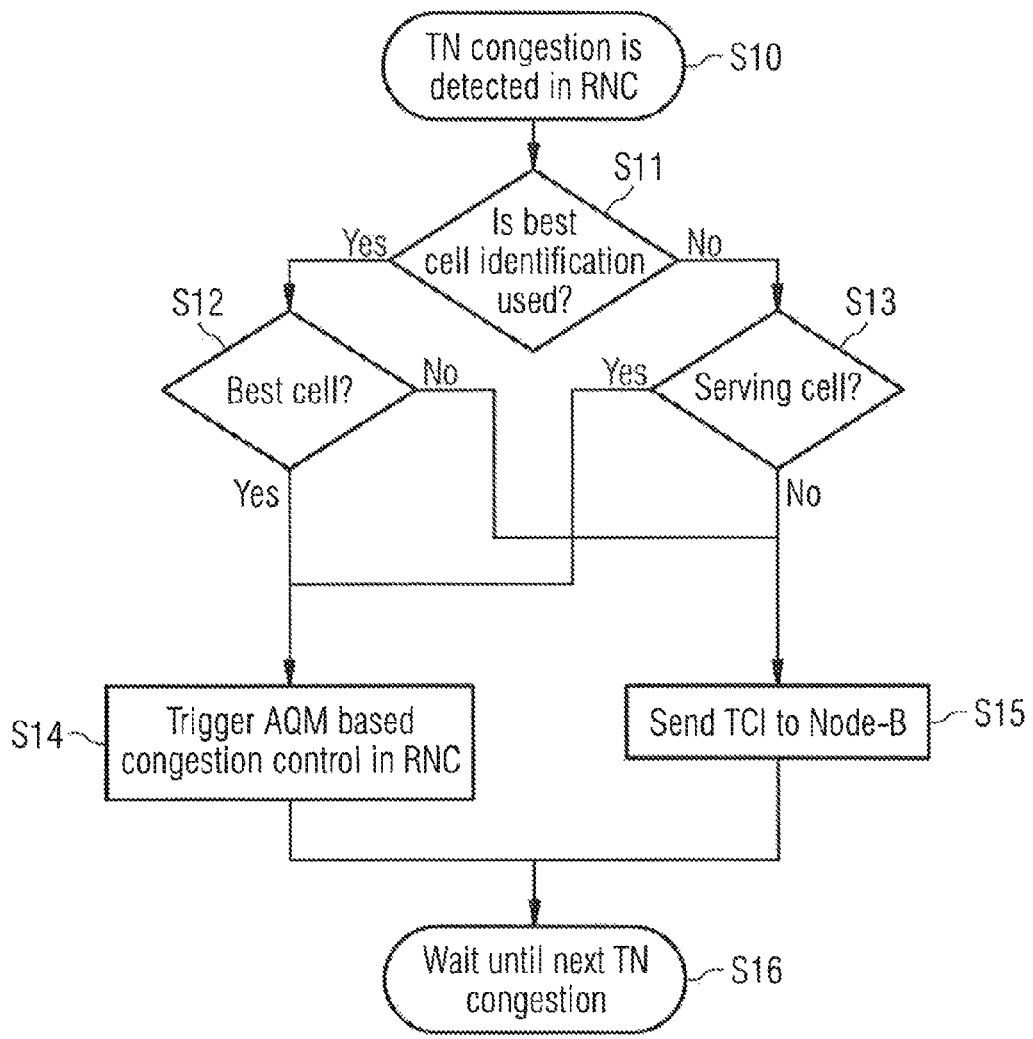

TECHNIQUE FOR HANDLING CONGESTION CONTROL

RELATED APPLICATIONS

This application claims the benefit of and priority to European Application Serial No. 12005089.3, filed 10 Jul. 2012. The entire contents of said European Application are incorporated herein by reference.

TECHNICAL FIELD

The present disclosure relates to a method of handling congestion control in a transport network of a radio access network. Further, the disclosure relates to a control node for congestion control in a transport network of a radio access network.

BACKGROUND

Wireless communications networks developed according to the $3^{rd}$-Generation Partnership Project (3GPP) specifications for the Universal Mobile Telecommunications System (UMTS) are known and have been deployed. Examples include Wideband Code Division Multiple Access ("WCDMA") UMTS communication networks, which usually comprise a plurality of Radio Network Controllers ("RNC"), each of the Radio Network Controllers being connected to a plurality of base stations (radio transceivers), also called Node Bs, via a corresponding Transport Network ("TN"). The Radio Network Controllers are connected with each other via a core network. The Node Bs communicate wirelessly with communication devices (also called User Equipment ("UE")).

In an UMTS communication network, congestion events often occur. Congestion events are, for example, a loss of a data packet or a delay of a data packet sent from a first component of the UMTS communication network to a second component of the UMTS communication network. Congestion events must be resolved in order to ensure a high performance of the UMTS communication network.

Accordingly, is desirable to improve the efficiency of UMTS communication networks or other communication networks having similar functionality with respect to handling congestion events.

SUMMARY

According to some embodiments of the present invention, methods for congestion control in a transport network of a radio access network are provided. The radio access network comprises a control node and two or more radio access nodes, where the two or more radio access nodes are coupled to the control node through the transport network. An example method comprises the following processes: a first uplink flow through a first communication link in the transport network from a first of the two or more radio access nodes, and a second uplink flow through a second communication link in the transport network from a second of the two or more radio access nodes are received by the control node. If congestion is detected in the transport network for the first uplink flow, either Active Queue Management (AQM)-based congestion control at the control node, or local congestion control at the first radio access node for the first uplink flow, is triggered by the control node. The congestion in the transport network may be detected by the control node itself, or by another node. If congestion is detected in the transport network for the second uplink flow, either AQM-based congestion control at the control node, or local congestion control at the second radio access node for the second uplink flow is triggered by the control node. The triggering is carried out such that AQM-based congestion control is carried out for only one of the first uplink flow or the second uplink flow if congestion is detected for both the first uplink flow and the second uplink flow.

One advantage of this approach is that high uplink ("UL") performance can be achieved. Further, this approach can be combined in an efficient manner with Transmission Control Protocol (TCP) communication carried out in the radio access network, i.e., TCP communication is disturbed very little by the congestion control. Further, existing hardware architectures can be used; in some embodiments only software changes to existing designs need be carried out. Still further, already existing functionality can be re-used in order to carry out the method.

According to some embodiments, the triggering of the AQM-based congestion control may comprise dropping an application level Internet Protocol (IP) packet to inform application level TCP about the congestion detected in the transport network. In some embodiments, triggering the second radio access node to perform local congestion control for the second uplink flow may comprise transmitting, by the control node, a Transport Network Layer (TNL) Congestion Indication (TCI) frame containing TCI for reporting the congestion detected in the transport network.

In some embodiments, in the event that the second radio access node is triggered to perform local congestion control, the local congestion control may comprise decreasing, by the second radio access node, the fraction of data packets forwarded in the second uplink flow to the control node. In this way, the congestion in the transport network may be resolved. The fraction of the forwarded data packets may be decreased for each TCI received by the second radio access node. In this way, an easy mechanism for controlling the fraction is provided.

In some embodiments, in the event that the second radio access node is triggered to perform local congestion control, the local congestion control may comprise stopping, by the second radio access node, forwarding of data packets in the second uplink flow. In this way, the congestion in the transport network may be resolved.

Further, some embodiments may further comprise, in the event that the second radio access node is triggered to perform local congestion control, a step of increasing, by the second radio access node, the fraction of the forwarded data packets by a predetermined amount after a predetermined time period.

Example methods may further comprise the processes of determining, by the control node, which of the first radio access node and the second radio access node is a serving radio access node for a mobile terminal providing data contained in the first and second uplink flows, and triggering, by the control node, AQM-based congestion control for the first uplink flow, if it is determined that the first radio access node is the serving radio access node.

Some embodiments may further comprise the steps of determining, by the control node, which of the first radio access node and the second radio access node has the best radio quality on the radio link to a mobile terminal providing data contained in the first and second uplink flows, and triggering, by the control node, AQM-based congestion control for the first uplink flow, if it is determined that the first radio access node has the best radio quality.

If congestion is detected is in the transport network for the second uplink flow, the control node may trigger local congestion control at the second radio access node for the second uplink flow if AQM-based congestion control has been triggered for the first uplink.

According to several embodiments of the present invention, the control node is implemented as a Radio Network Controller (RNC), and/or each of the at least two radio access nodes is implemented as a NodeB, and/or the transport network is implemented as an Iub transport network.

The communication links that are not controlled by AQM-based congestion control may use a congestion control that reacts earlier to TN congestion events than the AQM-based congestion control, e.g., a congestion detection that detects a dynamic delay of the data packets of the respective uplink flow. In this way, the communication links that are not controlled by AQM-based congestion control can react earlier to the congestion and therefore compensate the "late" reaction of the AQM-based congestion control.

According to some embodiments of the present invention, a non-transitory computer-readable medium comprises program code stored thereupon. The program code, when run on a computer system, performs one or more of the methods summarized above and/or detailed below, as well as variants thereof.

According to further embodiments of the invention, a control node for congestion control in a transport network of a radio access network is provided, the radio access network comprising the control node and two or more radio access nodes, wherein the two or more radio access nodes are coupled to the control node through the transport network. The control node comprises a receiving circuit for receiving a first uplink flow through a first communication link in the transport network from a first of the two or more radio access nodes and for receiving a second uplink flow through a second communication link in the transport network from a second of the two or more radio access nodes. The control node further comprises a triggering circuit adapted to trigger, if congestion is detected in the transport network for the first uplink flow, either AQM-based congestion control at the control node, or local congestion control at the first radio access node for the first uplink flow. The triggering circuit is further adapted to trigger, if congestion is detected in the transport network for the second uplink flow, either AQM-based congestion control at the control node, or local congestion control at the second radio access node for the second uplink flow. The triggering is carried out such that AQM-based congestion control is carried out for only one of the first uplink flow or the second uplink flow if congestion is detected for both the first uplink flow and the second uplink flow.

According to still further embodiments, a radio access network for congestion control in a transport network of the radio access network is provided, the radio access network comprising a control node according to an embodiment of the present invention and two or more radio access nodes, wherein the two more radio access nodes are coupled to the control node through the transport network. Embodiments of the present invention may in particular be used in UMTS communication networks.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

In the following, the present disclosure will be described in more detail with reference to exemplary embodiments illustrated in the drawings, wherein:

FIG. 1 shows a schematic drawing of a control node according to an aspect of the present invention;

FIG. 2 shows a schematic flow chart illustrating a method according to an aspect of the present invention;

FIG. 3 shows a schematic drawing of a radio access network according to an aspect of the present invention; and FIG. 4 shows a schematic flow chart illustrating a method according to an aspect of the present invention.

DETAILED DESCRIPTION

In the following description, for purposes of explanation and not limitation, specific details are set forth, such as specific device and system configurations and specific methods, steps and functions, in order to provide a thorough understanding of the technique presented herein. It will be appreciated that this technique may be practiced in other embodiments that depart from these specific details.

Those skilled in the art will further appreciate that the methods, steps and functions described herein may be implemented using individual hardware circuitry, using software functioning in conjunction with a programmed microprocessor or general purpose computer, using one or more Application Specific Integrated Circuits (ASICs), one or more DSPs and/or one or more Field Programmable Gate Arrays (FPGAs). It will also be appreciated that the technique disclosed herein may be embodied in a processor and a memory coupled to the processor, wherein the memory stores one or more programs that perform the methods, steps and functions described herein when executed by the processor.

With respect to the following embodiments, the same reference numerals are used to denote the same or similar components.

FIG. 1 shows a control node 10 for congestion control in a transport network 12 of a radio access network according to an aspect of the present invention. The radio access network comprises the control node 10 and two or more radio access nodes (not shown), wherein the two or more radio access nodes are coupled to the control node 10 through the transport network 12. The control node 10 comprises a receiving component 14 for receiving a first uplink flow F1 through a first communication link 16 in the transport network 12 from a first of the two or more radio access nodes and for receiving a second uplink flow F2 through a second communication link 18 in the transport network 12 from a second of the two or more radio access nodes. The control node 10 further comprises a triggering component 20 adapted to trigger, if congestion is detected in the transport network 12 for the first uplink flow F1, either AQM-based congestion control at the control node 10, or local congestion control at the first radio access node for the first uplink flow F1. The triggering component 20 is further adapted to trigger, if congestion is detected in the transport network 12 for the second uplink flow F2, either AQM-based congestion control at the control node 10, or local congestion control at the second radio access node for the second uplink flow F2. The triggering is carried out such that AQM-based congestion control is carried out for only one of the first uplink flow F1 and the second uplink flow F2 if congestion is detected for both the first uplink flow F1 and the second uplink flow F2. In other words, it is prevented that, in the case of detecting congestion for both the first uplink flow F1 and the second uplink flow F2, AQM-based congestion control is carried out for both the first uplink flow F1 and the second uplink flow F2.

Using the control node 10 as shown in FIG. 1, the following method for congestion control in a transport network 12 of a radio access network may be carried out, as shown in FIG. 2:

At S1, a first uplink flow F1 through a first communication link 16 in the transport network 12 from a first of the two or more radio access nodes, and a second uplink flow F2 through a second communication link 18 in the transport network 12 from a second of the two or more radio access nodes are received by the control node 10. At S2, if congestion is detected in the transport network 12 for the first uplink flow F1, either AQM-based congestion control at the control node 10, or local congestion control at the first radio access node for the first uplink flow F1 is triggered by the control node 10. At S3, if congestion is detected in the transport network 12 for the second uplink flow F2, either AQM-based congestion control at the control node 10, or local congestion control at the second radio access node for the second uplink flow F2 is triggered by the control node 10. The triggering is carried out such that AQM-based congestion control is carried out for only one of the first uplink flow F1 or the second uplink flow F2 if congestion is detected for both the first uplink flow F1 and the second uplink flow F2.

FIG. 3 shows a radio access network 30, according to an aspect of the present invention, which comprises a RNC as a control node 10 (which may have an architecture as shown in FIG. 1), a transport network 12, and two or more radio access nodes (in this example: Node Bs) 32, wherein the two more radio access nodes 32 are coupled to the control node 10 via the transport network 12. A first Node B 32A is coupled to the RNC 10 via a first communication link 16 comprising a first connection 34, which connects the first Node B 32A to the transport network 12, a second connection through the transport network 12 (not shown), and a third connection 36, which connects the transport network 12 to the RNC 10. A second Node B 32B is coupled to the RNC 10 via a second communication link 18 comprising a fourth connection 38, which connects the second Node B 32B to the transport network 12, a fifth connection through the transport network 12 (not shown), and the third connection 36, which connects the transport network 12 to the RNC 10. The second connection 36 may be split up into several connections, each one connecting one of the Node Bs 32 to the RNC 10. A UE 40 is connected via a wireless communication network 42 to the first Node B 32A and the second Node B 32B. The sum of the networks and connections connecting the UE 40 to the RNC 10 via the first Node B 32A is schematically indicated as "first leg" 44, and the sum of the networks and connections connecting the UE 40 to the RNC 10 via the second Node B 32B is schematically indicated as "second leg" 46. It should be noted that for reasons of simplicity only two legs are shown connecting the UE 40 to the RNC 10. However, the number of (non-serving) legs that connect the UE 40 to the RNC 10 is not limited.

The control node 10 comprises first congestion functionality 48 for congestion detection and congestion control and second congestion functionality 50 for congestion detection and congestion control. The first congestion functionality 48 is responsible for detecting and controlling congestion regarding the first uplink flow F1, which flows via the first leg 44, and the second congestion functionality 50 is responsible for detecting and controlling congestion regarding the second uplink flow F2, which flows via the second leg 46. The first congestion functionality 48 and the second congestion functionality 50 may, for example, respectively be part of the triggering component 20 of the control node 10 shown in FIG. 1. The first Node B 32A comprises third congestion functionality 52 for congestion control, and the second Node B 32B comprises fourth congestion functionality 54 for congestion control. The third congestion functionality 52 is responsible for controlling congestion regarding the first uplink flow F1, which flows via the first leg 44, and the fourth congestion functionality 52 is responsible for controlling congestion regarding the second uplink flow F2, which flows via the second leg 46.

The provision of the congestion functionality 48, 50, 52, and 54 enhances the properties of the radio access network 30, in particular regarding a soft-handover process between the first Node B 32A and the second Node B 32B: In a soft-handover process between the first Node B 32A and the second Node B 32B, the same data is sent from the UE 40 towards both the first Node B 32A and the second Node B 32B. However, due to different transmission qualities, individual congestion events and congestion control occur on the first leg 44 and the second leg 46 result, respectively. As a consequence, the resulting first and second uplink flows F1, F2 differ from each other regarding the data content. To carry out the individual (per leg) congestion detection/control, the first congestion functionality 48 is adapted to trigger, if congestion is detected in the transport network 12 for the first uplink flow F1, either AQM-based congestion control at the control node 10, or local congestion control at the first Node B 32A for the first uplink flow F1, i.e., for the first leg 44. Further, the second congestion functionality 50 is adapted to trigger, if congestion is detected in the transport network 12 for the second uplink flow F2, either AQM-based congestion control at the control node 10, or local congestion control at the second node B 32B for the second uplink flow F2, i.e., for the second leg 46. The triggering is carried out such that AQM-based congestion control is carried out for only one of the first uplink flow F1 and the second uplink flow F2 if congestion is detected for both the first uplink flow F1 and the second uplink flow F2. In this way, it is ensured that AQM-based congestion control is restricted to a minimum, which enhances the performance of the radio access network 30.

The radio access network 30 may for example be part of an UMTS communication network. The RNC 10 may comprise a communication protocol layer stack having a Mac-es protocol layer and a Radio Link Control ("RLC") protocol layer provided above the Mac-es protocol layer.

As has been already mentioned above, the restriction of AQM-based congestion control to a minimum enhances the performance of the radio access network 30. The inventors determined this advantage based on the following considerations.

In the following, it is assumed for purposes of example that a conventional radio access network is identical to the radio access network 30, but does not comprise the congestion functionalities 48, 50, 52, and 54. In such a conventional radio access network, during a soft-handover process, two or more Node-Bs 32 receive a signal from the UE 40. Thus, identical data is received at the RNC 10 via the first leg 44 and the second leg 46. The RNC 10 merges the data received from the first leg 44 and the second leg 46. For each of the first leg 44 and the second leg 46, a separate congestion control is used, each managing corresponding congestion detection and congestion actions for the corresponding leg.

However, assuming that AQM-based congestion control is used for each of the first leg 44 and the second leg 46, performance degradation of the radio access network may occur. For example, assuming that the first leg 44 mostly comprises fast connections and is used for a serving leg for the UE 40, and assuming that the second leg 46 mostly comprises slow connections and is used for a non-serving leg, a high performance first leg 44 ("serving cell"), and a slow performance second leg 46 (non-serving cell") results for the non-serving cell. Now assume that, due to this difference in connection qualities, there is congestion for the non-serving cell, i.e., congestion on the second leg 46, and that AQM-based congestion control (congestion action) is then carried out on the second leg 46, but not on the first leg 44. As consequence, since AQM-based congestion control adapts the bitrate of all legs, here the first leg 44 and the second leg 46 always are adapted to the weakest leg, i.e., in this example to the bitrate of the second leg 46, but not to the strongest leg, here the first leg 44. Thus, the bitrate of the first leg 44 is unnecessarily reduced also, although there is no need for this since there is no congestion on the second leg 46.

To summarize, applying the AQM-based congestion control for both the first leg 44 and the second leg 46 can result in serious unnecessary performance degradation, since AQM-based congestion control adapts the bitrate of all legs 44, 46, to the weakest of the legs 44, 46, and not to the strongest of the legs 44, 46.

In order to avoid this problem, according to an embodiment of the present invention, AQM-based congestion control is used for only one of the legs 44, 46, and for the respective other leg a Node-B local TN congestion control is used, i.e., congestion control is carried out in the first Node B 32A or in the second Node B 32B, depending on which link 44, 46, the congestion occurs.

When applying Node-B local TN congestion control, the communication load may be reduced by dropping a part of data packets received at the first Node B 32A or at the second Node B 32B from the UE 40, instead of forwarding all data received at the first Node B 32A or at the second Node B 32B to the RNC 10.

The decision regarding which of the legs 44, 46 is selected for AQM-based congestion control may be based on several approaches. For example, that of the legs 44, 46 assigned to a UE 40 which is the serving-leg may be chosen for AQM-based congestion control. Alternatively, the leg may be chosen in dependence on additional information, e.g., bitrate measurements. That is, that of the legs 44, 46 that shows the highest bitrate may be chosen. The selection does not have to be permanent; the selection may be updated during the lifetime of the connection between the UE 40 and the RNC if the connection conditions, e.g., the connection qualities of the legs 44, 46, change.

The selection of which of the legs 44, 46 is selected for AQM-based congestion control is done for each UE 40 separately; that is, for example, the first leg 44 may be operated using AQM-based congestion control for UE 40, but may be operated based on Node-B local TN congestion control for a different UE (not shown), i.e., a cell which is a serving cell for a first UE may be a non-serving cell for a different UE.

According to an embodiment, if a Node-B local congestion control algorithm is used for one of the legs 44, 46, the application level TCP is not informed that TN congestion has occurred on this leg for the following reason: If all parallel legs (in this example, legs 44 and 46) informed the application level TCP about congestion (assuming that congestion events have occurred on both legs 44, 46), then the application level TCP would adapt the uplink data transmission rate to the data transmission capacity of the leg having the lowest data transmission capacity, thereby degrading uplink performance. In order to avoid this, in embodiments of the present invention, only the leg having the highest data transmission capacity (serving cell or best cell) is allowed to inform the application level TCP about congestion. The remaining legs only do local congestion action, i.e., do not inform the application level TCP about congestion.

According to an embodiment, if it is determined that one of the non-serving cells (i.e., the second leg 46 in this example) has significantly better connection through the transport network 12, and/or a better radio quality (i.e., a better connection through the wireless communication network 42) than the serving cell (i.e., the first leg 44 in this example), then AQM-based congestion control may be used for the non-serving cell instead for the serving cell, and local TN congestion control is used for the serving cell and all other non-serving cells Node-B. In order to determine the connection qualities through the transport network 12 and through the wireless network 42, active measurements may be carried out, or available measurement information and information stored in the RNC and in the Node-Bs 32 may be used.

For all legs that are not chosen to use AQM-based congestion control (e.g., non-serving leg or poor connection quality leg), a TCI control frame may be sent from the RNC 10 to the corresponding Node-Bs 32 to inform the Node-Bs 32 about the need for Node-B local TN congestion control. No TCI control frame has to be sent for the leg chosen to use AQM-based congestion control. Since AQM-based congestion control does not require the use of TCI, TCI can be advantageously used as an already existing mechanism) to explicitly indicate that a local handling of TN congestion, i.e., Node-B local TN congestion control, is needed.

In the RNC 10 shown in FIG. 3, both the first leg and the second 44, 46 have their own TN congestion detection unit and AQM-based congestion control unit, summarized by the first congestion functionality 48, and by the second congestion functionality 50. The TN congestion detection unit may detect TN congestion, e.g., based on a gap in sequence numbers of Iub FP data frames sent from the Node Bs 32 to the RNC 10 (this gap results from a data packet loss between the Node-Bs 32 and the RNC 10, i.e. from a data packet loss in the transport network 12).

FIG. 4 shows an example how to operate the radio access network 30 shown in FIG. 3 At S10, a congestion event in the transport network 12 is detected at the RNC 10 by the first congestion functionality 48 for the first leg 44, or by the second congestion functionality 50 for the second leg 46. Let us assume that a congestion event in the transport network 12 is detected at the RNC 10 by the first congestion functionality 48 for the first leg 44. Then, at S12, it is determined whether best cell identification functionality is available in the RNC 10 in order to determine which of the legs 44, 46 has the best connection through the transport network 12 and/or the wireless communication network 42. If this functionality is available, then, at S12, it is determined whether the first leg 44 constitutes the best connection between the UE 40 and the RNC 10. If this is true, then, at S14, AQM-based congestion control action is triggered for the first leg 44. An application level IP packet may be dropped to inform the application level TCP about the congestion event. On the other hand, if it is determined at S12 that the first leg 44 does not constitute the best connection between the UE 40 and the RNC 10, then, at S15, a TCI frame is sent from the RNC 10 via the first leg 44 to the first Node B 32A, the TCI frame triggering the third congestion functionality 52 to carry out Node-B local TN congestion control for the first leg 44. If it is determined at S11 that best cell identification functionality is not available, then, at S13, it is determined whether the first leg 44 is the serving leg for UE 40 or not. If the first leg 44 is the serving leg, then the method proceeds with S14. If the first leg 44 is not the serving leg, then the method proceeds with S15. After S14 and S15, it is waited at S16 for the next congestion event to occur in the transport network 12.

If one of the Node-Bs 32 is informed by the RNC to carry out Node-B local TN congestion control, a reaction of the corresponding Node-B 32 may be to not forward all incoming data packets (received from the UE 40) towards the RNC 10, i.e., a fraction of the data packets received from the UE 40 may be dropped in the Node-B 32 to reduce the load of the transport network 12.

One advantage for using AQM-based congestion control is its TCP-friendly operation. This means that when TCP flows and AQM-based congestion controlled flows share the same bottleneck queue then the bandwidth share among them is fair. This is guaranteed by the reuse of the application level TCP in the AQM-based congestion control. Non-serving cells (or non-best cells) are using less aggressive congestion control mechanisms compared to the serving cell (or best cell), which uses TCP for congestion control. This effectively means that non-TCP flows are down-prioritized, compared to TCP flows.

With the presently disclosed solution, in soft-handover mode the serving cell (or best cell) will be TCP-friendly with other flows, because for that leg AQM-based congestion control is used. For other legs, less aggressive congestion control methods may be used, compared to TCP. In this way, traffic does not unnecessarily disturb the TCP traffic on that leg. In this way, the traffic of serving cells (or best cells) are sharing the available bandwidth in a TCP-friendly manner, and the traffic of non-serving cells (or non-best cells) are down-prioritized. In other words, TCP comprises an aggressive congestion control mechanism. This means that if a bottleneck is shared between a TCP flow and other flows handled by less aggressive congestion control mechanisms (like Node-B local TN congestion control), then most of the bandwidth can be used by the TCP.

Node-B local TN congestion control can be carried out in different ways. For example, as already indicated, a "drop based" TN congestion control may be used in the Node-Bs 32. That is, for each TCI frame received at the Node-Bs 32, the fraction of forwarded packets may be decreased (i.e. the drop rate is increased). When there is no TCI frame received at the Node-Bs 32, the fraction of forwarded packets may be gradually increased. An example parameter setting for this is: The fraction of forwarded packets is increased with 10% in each second. If a TCI frame is received, then the fraction of forwarded packet is decreased, e.g., by 50%. Less aggressive congestion actions may be taken in order to increase the bandwidth share of non-serving cells. In order to more strictly prioritize the serving cells traffic over a TN bottleneck, more aggressive congestion actions may be taken, e.g., when a TCI frame is received, then stopping the data forwarding towards the RNC for a while for non-serving traffic (e.g., some seconds).

For non-serving (non-best) cells/legs, high-sensitivity TN congestion detection (more sensitive than TN congestion detection using TCP) may also be used. For example, a dynamic-delay-based TN congestion detection may be used for non-serving (non-best) cells/legs, where e.g., a delay build up in a TN queue is also detected by the TN congestion detection functionality. In this way, congestion can be reacted to earlier, i.e., already in the case of a potential TN congestion. In other words, if more sensitive congestion detection mechanisms are used, then it is possible to react earlier for TN congestion, i.e., eventually before a data packet loss has occurred. In contrast, TCP detects congestion based on a data packet loss, which is relatively "late". For example, let us assume that there is a bottleneck with respect to a TCP flow and with respect to another flow controlled with sensitive delay based congestion detection. Let us further assume that a large buffer is used for transmitting the flows. If the buffer is starting to build up (fill), then the second flow, which uses dynamic-delay-based TN congestion, is able to detect TN congestion based on a detected increased delay of the data packets. In contrast, TCP is not able to detect TN congestion in this early stage. In this way, it is possible that the congestion functionality of the non-serving (non-best) cells/legs already takes a congestion action (i.e., reduce the bitrate on their legs) at this stage, whereas TCP does not reduce its bitrate at this stage. In this way, the early reaction of the (non-best) cells/legs compensates for the late reaction of the serving (best) cells/legs.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method for congestion control in a transport network of a radio access network, the radio access network comprising a control node and two or more radio access nodes, wherein the two or more radio access nodes are coupled to the control node through the transport network, the method comprising:

receiving, by the control node, a first uplink flow through a first communication link in the transport network from a first of the two or more radio access nodes and receiving, by the control node, a second uplink flow through a second communication link in the transport network from a second of the two or more radio access nodes; and if congestion is detected in the transport network for the first uplink flow, triggering, by the control node, either Active Queue Management (AQM)-based congestion control at the control node or local congestion control at the first radio access node for the first uplink flow; and if congestion is detected in the transport network for the second uplink flow, triggering, by the control node, either AQM-based congestion control at the control node or local congestion control at the second radio access node for the second uplink flow;

wherein the triggering is carried out such that AQM-based congestion control is carried out for only one of the first uplink flow or the second uplink flow if congestion is detected for both the first uplink flow and the second uplink flow.

2. The method of claim 1, wherein said triggering, by the control node, of the AQM-based congestion control comprises dropping an application level Internet Protocol (IP) packet to inform application level Transmission Control Protocol (TCP) about the congestion detected in the transport network.

3. The method of claim 1, wherein said triggering the second radio access node to perform local congestion control for the second uplink flow comprises transmitting, by the control node, a Transport Network Layer (TNL) Congestion Indication (TCI) frame containing TCI for reporting the congestion detected in the transport network.

4. The method of claim 1, wherein, in the event of triggering the second radio access node to perform local congestion control, the local congestion control comprises decreasing, by the second radio access node, the fraction of data packets forwarded in the second uplink flow to the control node.

5. The method of claim 4, wherein said triggering the second radio access node to perform local congestion control for the second uplink flow comprises transmitting, by the control node, a Transport Network Layer (TNL) Congestion Indication (TCI) frame containing TCI for reporting the congestion detected in the transport network, wherein the fraction of the forwarded data packets is decreased for each TCI received by the second radio access node.

6. The method of claim 1, wherein, in the event of triggering the second radio access node to perform local congestion control, the local congestion control comprises stopping, by the second radio access node, forwarding of data packets in the second uplink flow.

7. The method of claim 4, wherein, in the event of triggering the second radio access node to perform local congestion control, the method further comprises increasing, by the second radio access node, the fraction of the forwarded data packets by a predetermined amount after a predetermined time period.

8. The method of claim 1, wherein the congestion in the transport network is detected by the control node.

9. The method of claim 1, wherein the method further comprises:
   determining, by the control node, which of the first radio access node and the second radio access node is a serving radio access node for a mobile terminal providing data contained in the first and second uplink flows; and
   triggering, by the control node, AQM-based congestion control for the first uplink flow, if it is determined that the first radio access node is the serving radio access node.

10. The method of claim 1, wherein the method further comprises:
    determining, by the control node, which of the first radio access node and the second radio access node has the best radio quality on the radio link to a mobile terminal providing data contained in the first and second uplink flows; and
    triggering, by the control node, AQM-based congestion control for the first uplink flow, if it is determined that the first radio access node has the best radio quality.

11. The method of claim 1, wherein if congestion is detected in the transport network for the second uplink flow, triggering, by the control node, local congestion control at the second radio access node for the second uplink flow if AQM-based congestion control has been triggered for the first uplink flow.

12. The method of claim 1, wherein the control node is implemented as a Radio Network Controller (RNC).

13. The method of claim 12, wherein each of the at least two radio access nodes is implemented as a NodeB.

14. The method of claim 12, wherein the transport network is implemented as an Iub transport network.

15. A non-transitory computer-readable medium comprising a computer program stored thereupon, the computer program comprising program code portions, which when run by a processor in a control node, cause the control node to
   receive, by the control node, a first uplink flow through a first communication link in the transport network from a first of the two or more radio access nodes and receiving, by the control node, a second uplink flow through a second communication link in the transport network from a second of the two or more radio access nodes, and:
   if congestion is detected in the transport network for the first uplink flow, trigger, by the control node, either Active Queue Management (AQM)-based congestion control at the control node or local congestion control at the first radio access node for the first uplink flow; and
   if congestion is detected in the transport network for the second uplink flow, trigger, by the control node, either AQM-based congestion control at the control node or local congestion control at the second radio access node for the second uplink flow;
   wherein the triggering is carried out such that AQM-based congestion control is carried out for only one of the first uplink flow or the second uplink flow if congestion is detected for both the first uplink flow and the second uplink flow.

16. A control node for congestion control in a transport network of a radio access network that comprises the control node and two or more radio access nodes, wherein the two or more radio access nodes are coupled to the control node through the transport network, wherein the control node comprises:
   a receiving circuit adapted to receive a first uplink flow through a first communication link in the transport network from a first of the two or more radio access nodes and to receive a second uplink flow through a second communication link in the transport network from a second of the two or more radio access nodes; and
   a triggering circuit adapted to trigger, if congestion is detected in the transport network for the first uplink flow, either Active Queue Management (AQM)-based congestion control at the control node, or local congestion control at the first radio access node for the first uplink flow, and adapted to trigger, if congestion is detected in the transport network for the second uplink flow, either AQM-based congestion control at the control node, or local congestion control at the second radio access node for the second uplink flow, wherein the triggering circuit is adapted to carry out the triggering such that AQM-based congestion control is carried out for only one of the first uplink flow or the second uplink flow if congestion is detected for both the first uplink flow and the second uplink flow.

17. A radio access network for congestion control in a transport network of the radio access network, the radio access network comprising the control node of claim 16 and two or more radio access nodes, wherein the two more radio access nodes are coupled to the control node through the transport network.

* * * * *